United States Patent [19]

Weisfeld et al.

[11] 3,725,338
[45] Apr. 3, 1973

[54] THERMOSTABILIZED CHLORINE-CONTAINING POLYMERS

[75] Inventors: Lewis B. Weisfeld, Highland Park, N.J.; Holger Andreas, Bensheim-Auerbach; Horst Müller, Fuerth, both of Germany

[73] Assignee: Ciba-Geigg Marienberg GmbH

[22] Filed: Sept. 4, 1970

[21] Appl. No.: 69,988

[30] Foreign Application Priority Data

Sept. 12, 1969 Germany.....................P 19 46 235.2

[52] U.S. Cl.......260/45.75 K, 252/401, 260/45.75 R, 260/45.85 A, 260/899
[51] Int. Cl................................................C08f 45/58
[58] Field of Search .....260/45.75 R, 45.75 K, 45.85, 260/899, 45.85 A; 252/401

[56] References Cited

UNITED STATES PATENTS

| | | | |
|---|---|---|---|
| 2,746,946 | 5/1956 | Weinberg et al. | 260/45.75 |
| 3,021,302 | 2/1962 | Frey et al. | 260/45.75 |
| 2,267,777 | 12/1941 | Yngve | 260/45.75 |
| 3,167,527 | 1/1965 | Hechenbleikner | 260/45.75 |
| 3,412,139 | 11/1968 | Eggensperger et al. | 260/45.85 |
| 3,249,584 | 5/1966 | Gasparis | 260/45.85 |

*Primary Examiner*—Donald E. Czaja
*Assistant Examiner*—V. P. Hoke
*Attorney*—Christen & Sabol

[57] ABSTRACT

Compositions comprising an ester of aminocrotonic acid and 0.1 to 10 weight per cent of an organometal compound corresponding to the formula $$[RR_a'R_b''MeZ_{3-a-b}]$$

wherein R, R' and R'' are alkyl radicals having 1 to 8 carbon atoms and phenyl, Z is one-half oxygen or one-half sulfur, $a$ and $b$ are 0 or 1, Me is tin or lead and $n$ is an integer of 1 to 1000, preferably 1 to 100, are useful heat stabilizers for halogen containing resins. Halogen containing resins suitable for stabilization with these compositions are polyvinyl chloride, polyvinylidene chloride, copolymers of vinyl chloride with vinylidene chloride, vinyl acetate and styrene as well as chlorinated mixtures of polyvinyl chloride and polyolefins.

7 Claims, No Drawings

THERMOSTABILIZED CHLORINE-CONTAINING POLYMERS

This invention relates to novel synergistic stabilizer compositions and resins stabilized therewith. More particularly, this invention relates to esters of aminocrotonic acid in combination with certain organometal compounds and halogen-containing resins stabilized therewith.

Halogen-containing resins, such as polyvinyl chloride, polyvinylidene chloride, copolymers of vinyl chloride with vinyldene chloride, vinyl acetate or styrene and chlorinated mixtures of polyvinyl chloride and polyolefins must be stabilized against thermal degredation. While esters of aminocrotonic acid have been used to stabilize these resins, they provide very poor protection against early discoloration, such as that ocurring during mechanical processing and shaping.

We have discovered that the disadvantages of esters of aminocrotonic acid are overcome by the addition of small amounts of certain organometal compounds. The organometal compounds exhibiting this phenomenon are the alkyl and phenyl tin and lead oxides or sulfides. These compounds correspond to the formula:

$$[RR_a'R_b''MeZ_{3-a-b}]_n$$

wherein R, R' and R'' are alkyl radicals having 1 to 8 carbons or phenyl, Z is one-half oxygen or one-half sulfur, Me is tin or lead, a and b are 0 or 1 and $n$ is whole number.

Mono organometal compounds suitable for practicing the present invention include stannoic acids and thiostannoic acids such as, methyl stannoic acid, butyl stannoic acid, hexyl stannoic acid, octyl stannoic acid, 2-ethylhexyl stannoic acid, phenyl stannoic acid, methyl thiostannoic acid, butyl thiostannoic acid, hexyl thiostannoic acid, octyl thiostannoic acid, 2-ethylhexyl thiostannoic acid and phenyl thiostannoic acid. Diorgano and triorgano metal compounds suitable for practicing the present invention are the oxides or sulfides of tin and lead. Examples include dimethyltin oxide, dimethyltin sulfide, trimethyltin oxide, trimethyltin sulfide, dibutyltin oxide, dibutyltin sulfide, tributyltin oxide, tributyltin sulfide, dioctyltin oxide, dioctyltin sulfide, trioctyltin oxide, trioctyltin sulfide, diphenyltin oxide, diphenyltin sulfide, triphenyltin oxide, triphenyltin sulfide, dimethyllead oxide, dimethyllead sulfide, dibutyllead oxide, dibutyllead sulfide, tributyllead oxide, tributyllead sulfide, diphenyllead oxide, diphenyllead sulfide, triphenyllead oxide and triphenyllead sulfide.

These organometalic compounds can be monomeric but are primarily olemeric and polymeric. For examples, the acids may be polymeric and if so correspond to the formulas $(RSnO_{1.5})_n$ or $(RSnS_{1.5})_n$. The diorganometal compounds can be simple oxides or sulfides or polymers of the formulas

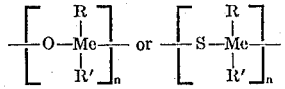

The tris organometal compounds are bis oxides or sulfides corresponding to the formulas

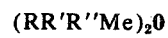

or

Although n maybe as great as 1000, 100 units is a preferred maximum.

Suitable esters for practicing the present invention are prepared by conventional methods from aminocrotonic acid and, mono,-di- and trihydric aliphatic alcohols having 1 to 20 carbons and preferably 1 to 10 carbons such as methanol, ethanol, butanol, hexanol, octanol, decanol, dodecanol, stearol, isopropanol, sec. butanol, 2-ethyl hexanol, ethylene glycol, propylene glycol, 1,4-butanediol, 1,8-octanediol and 2-ethyl-1-6-hexanediol. Alcohols containing ether and thioether groups are also suitable. Examples include 2-ethoxyethanol, 2-ethylthioethanol, oxydiethylene glycol, thiodiethylene glycol, oxydipropylene glycol, 6-ethoxy hexanol and 4-ethyl mercapto octanol. Commercial mixtures of aminocrotonic acid ester are also suitable.

The synergistic compositions of the present invention contain 90 to 99.9 weight per cent of the aminocrotonic acid ester and 0.1 to 10 weight per cent of the organometal compound. Preferably, the compositions contain 0.5 to 5 weight per cent of the organometal compound.

The synergistic compositions may be used as stabilizers in amounts of 0.1 to 5 weight per cent of the resin and preferably in amounts of 1 to 3 weight per cent.

Resins which are suitable for thermal stabilization with the synergistic combinations of the present invention include polyvinyl chloride, polyvinylidene chloride, copolymers of vinyl chloride with vinylidene chloride, vinyl acetate and styrene as well as chlorinated mixtures of polyvinyl chloride and polyolefins.

EXAMPLES 2 g of a stabilizer were mixed into 100 g of various polymers, milled for 5 minutes at 180°C and sheeted off. The foils were thermally exposed at 170°C in a drying oven equipped with rotating supports. At intervals of 15 minutes, samples were withdrawn and the discoloration observed. The Tables contain the results for various combinations of polymers and stabilizers. Comparative samples were produced and tested, which contained the amino crotonic acid esters or organometal compounds as the only stabilizer.

In the Tables, the letters and Roman numerals identify the following:

A = thiodiethylene glycol amino crotonate
B = octylamino crotonate
C = ethylene glycol amino crotonate
D = oxydipropylene glycol amino crotonate
E = commercial amino crotonic acid ester mixture
F = methyl stannoic acid
G = butyl stannoic acid
H = butyl thiostannoic acid
J = octyl thiostannoic acid
K = phenyl stannoic acid
L = dibutyl tin oxide
M = dibutyl tin sulfide
N = dioctyl tin oxide
O = diphenyl tin oxide
P = diphenyl lead oxide
Q = diphenyl lead sulfide
R = triphenyl tin oxide
S = triphenyl lead oxide I = colorless
II = slight yellowing
III = yellow
IV = orange
V = brown
VI = black

| Stabilizer | PVC K-value 58 | | | | PVC K-value 57 | | | Commercial mixture of K-value 60 from subsequently chlorinated polyolefin and PVC | |
|---|---|---|---|---|---|---|---|---|---|
| A | 1.95 | 1.95 | 1.95 | 1.95 | | | | 2.0 | 1.95 |
| B | | | | | 2.0 | 1.95 | | | |
| D | | | | | | 2.0 | | 1.95 | |
| E | | | | | | | | 2.0 | 1.95 |
| G | | | | | | 0.05 | 0.05 | | |
| H | | | | | 0.05 | | | 0.05 | |
| K | 0.05 | 0.05 | | | | | | | |
| O | | | 0.05 | 0.05 | | | | | |
| P | | 0.05 | 0.05 | | | | | | |
| Q | | | | 0.05 | 0.05 | | | | |
| S | | | | | | | | | 0.05 |
| Test foil:[1] | | | | | | | | | |
| 0 | V | V | II | II | II | II | II | II | |
| 15 | VI | VI | V | IV | V | III | III | III | |
| 30 | II | II | VI | II | II | V | II | IV | II |
| 45 | III | III | II | II | VI | III | V | IV | V | III |
| 60 | VI | IV | III | III | IV | VI | IV | V | III | VI | V |
| 75 | V | V | V | V | V | | VI | V | III | VI |
| 90 | VI | VI | VI | VI | VI | | VI | III | |

[1] Discoloration at 170° after minutes indicated.

| Stabilizer | PVC K-value 58 | | | | PVC K-value 57 | | | Commercial mixture of K-value 60 from subsequently chlorinated polyolefin and PVC | | |
|---|---|---|---|---|---|---|---|---|---|---|
| A | 2.0 | 1.99 | 1.95 | 1.95 | 1.95 | 1.95 | 1.9 | 1.9 | | |
| C | | | | | | | | | 2.0 | 1.95 | 1.95 |
| F | | | | | | 0.1 | 0.1 | | | |
| H | 0.05 | 0.01 | 0.05 | | | | | | | |
| I | | | 0.05 | 0.05 | | | | | | |
| L | | | | | | | | | 0.05 | 0.05 | |
| M | | | | | | | | | | 0.05 | 0.05 |
| N | | | | 0.05 | 0.05 | | | | | |
| R | | | | | | 0.1 | 0.1 | | | |
| S | | | | | 0.05 | 0.05 | | | | |
| Test foil:[1] | | | | | | | | | | |
| 0 | II | II | I | I | IV | IV | IV | III | III | II | IV | II | I |
| 15 | III | II | I | IV | V | V | V | V | III | V | V | I |
| 30 | III | V | II | V | VI | II | V | VI | VI | IV | VI | VI | I |
| 45 | IV | V | III | II | V | II | III | II | | V | II | II |
| 60 | V | VI | IV | III | V | II | III | II | II | VI | IV | IV |
| 75 | V | IV | III | V | IV | IV | IV | III | II | IV | IV |
| 90 | VI | V | IV | V | V | V | V | V | V | V | V |

[1] Discoloration at 170° after minutes indicated.

What is claimed:

1. A heat stabilizer composition for halogen containing resins comprising an ester corresponding to the formula:

$$CH_3\underset{|}{C}=CHCOOR_1$$
$$NH_2$$

wherein $R_1$ is the residue of an alcohol having up to 20 carbons selected from the group consisting of an alkyl, alkoxyalkyl, alkylthioalkyl, hydroxyalkyl, hydroxyalkoxyalkyl, hydroxyalkylthioalkyl, $$CH_3\underset{|}{C}=CHCOO\text{ alkyl,}$$
$$NH_2$$

$$CH_3\underset{|}{C}=CHCOO\text{ alkoxyalkyl and }CH_3\underset{|}{C}-COO$$
$$NH_2 \qquad\qquad NH_2$$

alkylthioalkyl and 0.1 to 10 weight percent based on said composition of an organo metal compound corresponding to the formula $[RR_a'R_b''MeZ_{3-a-b}]_n$ wherein Me is tin or lead, R, R' and R'' are selected from the group consisting of alkyl having 1 to 8 carbons and phenyl when Me is tin, R, R' and R'' are phenyl when Me is lead, Z is oxygen or sulfur, $a$ and $b$ are zero or 1 and $n$ is an integer of 1 to 1000.

2. The heat stabilizer composition of claim 1 wherein the organo metal compound is present in an amount of 0.5 to 5 weight per cent corresponds to a formula selected from the group consisting of

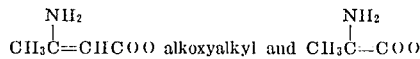

(RR'R''Sn)$_2$O and (RR'R''Sn)$_2$S wherein $n$ is 2 to 100.

3. The heat stabilizer composition of claim 1 wherein the organo metal compound is present in an amount of 0.5 to 5 weight per cent corresponds to a formula selected from the group consisting of

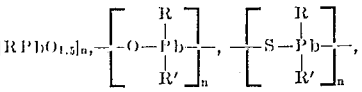

(RR'R''Pb)$_2$O and (RR'R''Pb)$_2$S wherein $n$ is 2 to 100.

4. The heat stabilizing composition of claim 1 wherein said ester is selected from the group consisting of thiodiethylene glycol amino crotonate, octylamino crotonate, ethylene glycol amino crotonate and oxydipropylene glycol amino crotonate and said organo metal compound is present in an amount of 0.5 to 5 weight per cent and is selected from the group consisting of methyl stannoic acid, butyl stannoic acid, butyl thiostannoic acid, octyl thiostannoic acid, phenyl stannoic acid, dibutyl tin oxide, dibutyl tin sulfide, dioctyl tin oxide, diphenyl tin oxide, diphenyl lead oxide, diphenyl lead sulfide, triphenyl tin oxide and triphenyl lead sulfide.

5. A halogen containing resin composition comprising a resin selected from the group consisting of polyvinyl chloride, polyvinylidene chloride, copolymers of vinyl chloride with vinylidene chloride, vinyl acetate and styrene and mixtures of polyvinyl chloride and chlorinated polyolefins and 0.1 to 5 weight per cent of the stabilizer of claim 1.

6. A polyvinylchloride resin composition containing 1 to 3 weight per cent of the stabilizer of claim 2.

7. A polyvinyl chloride resin composition of claim 6 wherein said resin is polyvinyl chloride containing 1 to 3 weight per cent of the stabilizer of claim 3.

* * * * *